United States Patent [19]

Lambrecht

[11] 4,397,713

[45] Aug. 9, 1983

[54] METHOD OF PROCESSING WASTE PAPER AND INSTALLATION FOR THE PERFORMANCE OF THE METHOD

[75] Inventor: Gerhard Lambrecht, Fronreute, Fed. Rep. of Germany

[73] Assignee: Escher Wyss GmbH, Ravensburg, Fed. Rep. of Germany

[21] Appl. No.: 197,117

[22] Filed: Oct. 15, 1980

[30] Foreign Application Priority Data

Nov. 15, 1979 [CH] Switzerland .................. 10187/79

[51] Int. Cl.³ ............................................. D21B 1/32
[52] U.S. Cl. ...................................... 162/261; 162/4; 209/3; 209/17
[58] Field of Search ................... 209/3, 17, 250; 162/4.5, 261; 241/46.17, 28, 29, 78, 79.2

[56] References Cited

U.S. PATENT DOCUMENTS

| 4,219,381 | 8/1980 | Schnell ...................................... 162/4 |
| 4,231,526 | 11/1980 | Ortner et al. ............................. 162/4 |

FOREIGN PATENT DOCUMENTS 2413278  9/1975  Fed. Rep. of Germany .......... 162/4

Primary Examiner—William F. Smith
Attorney, Agent, or Firm—Werner W. Kleeman

[57] ABSTRACT

A method of preparing waste paper wherein the waste paper is defiberized in water within a stock slusher or pulper. Following the stock pulper there is removed from the stock suspension all of the already available good stock fibres by means of a sieve or screen device. The remainder of the stock suspension is then subjected to a comminution action and is again screened. The screening and comminution can take place in a first fiberizer or secondary pulper having a finer sieve or screen than a conventional secondary pulper. The overflow of the first secondary pulper is infed to a second secondary pulper and the overflow thereof is then fed to a dynamic jarrer or vibrator. Forwardly of the dynamic jarrer there is arranged a vat containing a circulation system of a despeckling device.

4 Claims, 1 Drawing Figure

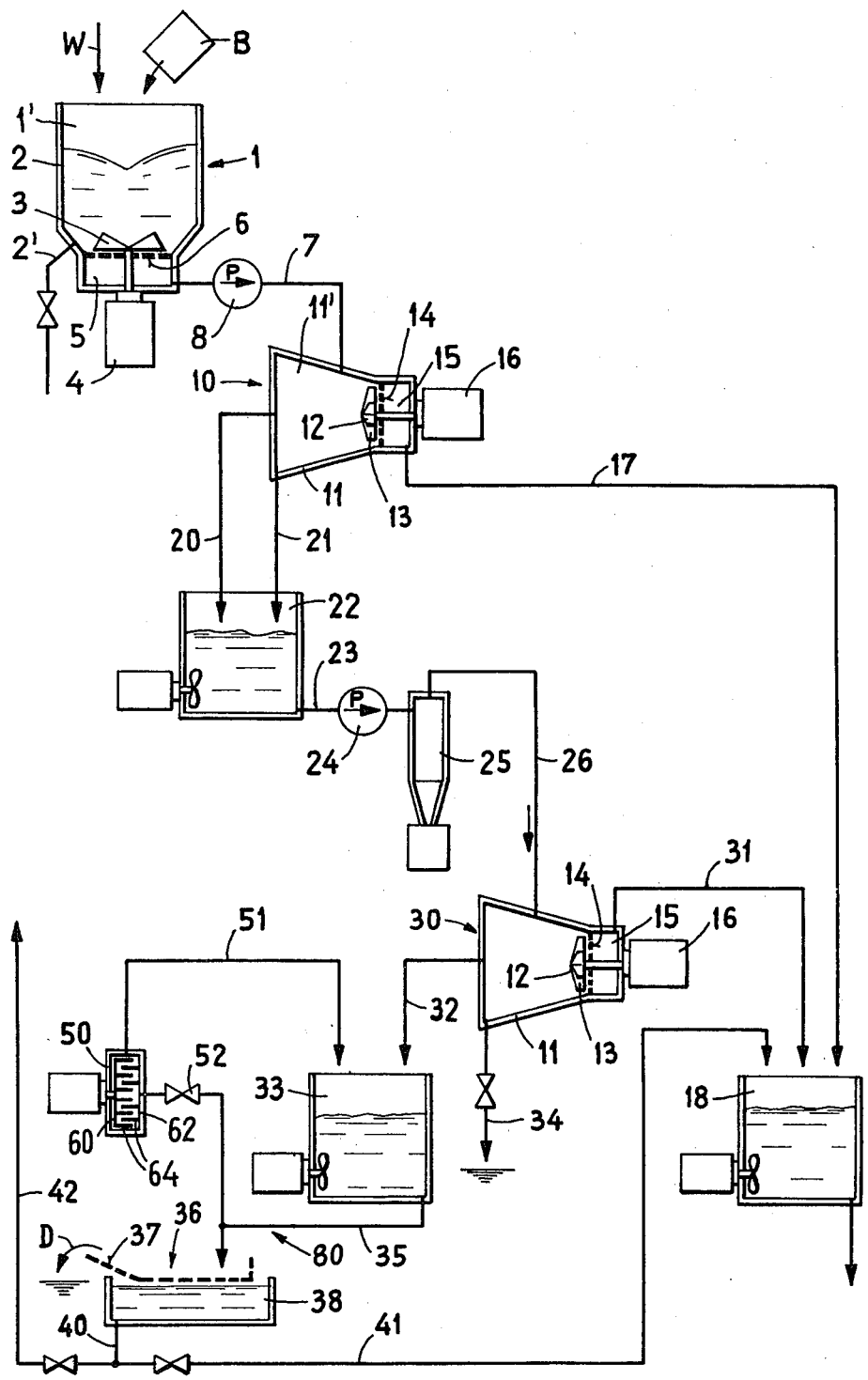

METHOD OF PROCESSING WASTE PAPER AND INSTALLATION FOR THE PERFORMANCE OF THE METHOD

BACKGROUND OF THE INVENTION

The present invention relates to a new and improved method of, and apparatus for, processing waste paper in order to obtain a stock suspension for the fabrication of new paper and cardboard, wherein the waste paper is defiberized in water within a stock pulper or slusher.

With heretofore known installations of this type, such as disclosed for instance in Austrian Patent No. 346,170, the stock pulper has arranged thereafter a secondary pulper or fiberizer. The good stock effluxing out of the secondary pulper is subjected to a complicated post-treatment before it reaches the paper-making machine. On the other hand, the overflow of the secondary pulper, containing the contaminants, is returned back into the stock pulper or slusher. The equipment needed for this purpose is relatively complicated and also requires a great deal of energy, since the total quantity of the obtained stock suspension must be processed during the post-treatment and also the return flow into the stock pulper or slusher means that this slusher is additionally loaded.

SUMMARY OF THE INVENTION

Therefore, with the foregoing in mind it is a primary object of the present invention to provide a new and improved method of, and apparatus for, processing waste paper which is not associated with the aforementioned drawbacks and limitations of the prior art constructions.

Another and more specific object of the present invention aims at providing a new and improved method of, and apparatus for, processing waste paper by means of which it is possible to accomplish the waste paper processing operation in an appreciably simpler manner and with the use of much simpler means, and additionally there is required a lesser expenditure in energy.

Now in order to implement these and still further objects of the invention, which will become more readily apparent as the description proceeds, the method of the present development is manifested by the features that there are screened from the stock suspension following the stock slusher or pulper, by means of a sieve or screen device having suitable perforations or holes, all fibres which are directly suitable for paper fabrication, whereas the contaminants which do not pass through the screen and the overflow containing incompletely defiberized paper parts is subjected to a mechanical comminution action, whereafter by means of a subsequently connected sieve or screen device having suitable perforations or holes there is again screened all fibres which are directly suitable for the paper fabrication.

With the mode of operation according to the inventive method an extremely large proportion of the fibrous material in the form of already usable stock suspension is eliminated from the processing operation, so that the post-treatment can be limited to an appreciably smaller proportion of the material which is to be processed. The smaller quantity of material thereafter can be intensively post-treated with reduced energy consumption, and likewise the obtained good stock can be immediately infed to the papermaking machine.

Preferably, also the overflow of the second sieve or screen device can be subjected to a mechanical comminution action, and thereafter can be screened in a third screen or sieve device. As a result there is further increased the yield in good stock from the infed waste paper.

Moreover, the overflowing stock suspension of the second screen device, prior to being delivered to the third screen device, can be subjected to shearing loads. Due to the shearing loads, for instance in a conventional despeckling device, there are defiberized selective pieces of waste paper, whereas plastic foils remain essentially uncomminuted. This facilitates the subsequent separation of the plastic foils from the paper fibres by screening.

The apparatus or installation of the present invention, suitable for performing the inventive method, comprises a stock pulper or slusher and a secondary pulper or fiberizer arranged after the stock pulper. The fiberizer contains a housing in which there is located a sieve or screen and a motor-driven rotor provided with arms. The arms move along the screen. Merging with the sieve or screen is an outlet for good stock which passes through the screen, and the housing contains at least one outlet for material overflow effluxing out of the housing.

According to the inventive installation the sieve of the secondary pulper or fiberizer contains perforations which are suitable for eliminating fibres which can be directly employed for paper fabrication. At the outlet for the good stock of the secondary pulper or fiberizer there is connected the vat or tub of the papermaking machine. At the outlet for the material overflow from the first secondary pulper or fiberizer there is connected a second secondary pulper or fiberizer which likewise has a sieve or screen containing perforations or holes which serve for screening all fibres which can be directly used for paper fabrication. The outlet of the second fiberizer for good stock passing through the screen likewise is connected with the vat of the papermaking machine.

With this construction of installation the basically known stock pulper or slusher has imparted thereto a new action in that it serves for screening the fibre material from the stock suspension and already used following the stock slusher or pulper. The secondary pulper or fiberizer enables, in a most simple manner, combining the screening and mechanical comminution action in a single housing and in a single machine. As to the known secondary pulpers or fiberizers the secondary pulper of the instant installation differs therefrom due to the perforations or holes of the screen or sieve which are appreciably smaller than those of the known stock pulpers. Those are therefore not capable of screening the fibres which are directly suitable for paper fabrication.

It should however be expressly understood that the screening and comminution in the secondary stock pulpers or fiberizers only constitutes one particular advantageous measure, and that there can be additionally used, for instance, separate thick stock sorting devices containing special grinding devices.

The sieve or screen of the first secondary pulper preferably can be provided, for the stated purpose, with perforations having a hole diameter in a range of two to three millimeters.

Preferably, the screen of the second secondary pulper or fiberizer likewise can contain perforations having a hole diameter in a range of two to three millimeters.

These are holes or openings which are suitable for eliminating the employed good stock, whereas fibre lumps and contaminants no longer can pass through the screen or sieve and remain in the circulation system of the related stock pulper.

At the oulet line for lighter material overflow of the second secondary pulper or fiberizer there can be connected a dynamic jarrer or vibrator. This dynamic jarrer forms a third sieve or screen device which enables further obtaining useful stock fibres, whereas by means of the screen of the dynamic jarrer there are finally separated-out the parts which have not passed therethrough.

The line or conduit leading from the second secondary pulper or fiberizer to the dynamic jarrer can be equipped with a despeckling device which exerts shear loads. This despeckling device enables carrying out the aforementioned selective comminution of paper pieces, whereas plastic foils essentially are not comminuted, so that they can be eliminated with the aid of the sieve or screen of the dynamic jarrer or vibrator.

For this purpose there can be provided a vat in the outlet line or conduit for the lighter overflow of the second stock pulper or fiberizer, and the despeckling device is connected in a circulation flow system of the vat. This arrangement enables separating the throughflow quantity of the despeckling device from the quantity flowing into the outlet line. Hence, the despeckling device or equivalent structure always has available to it optimum working conditions.

In particularly favourable cases the throughflow container of the dynamic jarrer or vibrator likewise can be connected with the vat of the papermaking machine. Otherwise there is possible a return of the liquid containing the paper fibres and effluxing from the throughflow container into a suitable part of the installation.

BRIEF DESCRIPTION OF THE DRAWING

The invention will be better understood and objects other than those set forth above will become apparent when consideration is given to the following detailed description thereof. Such description makes reference to the annexed drawing wherein the single FIGURE schematically illustrates an exemplarly embodiment of installation for processing waste paper and constructed according to the invention.

DETAILED DESCRIPTION OF THE PREFERRED EMBODIMENTS

Describing now the drawing, the installation for processing waste paper and working according to the teachings of the method of this development, shown by way of example and not limitation, will be seen to contain a stock pulper or slusher 1 constructed in conventional manner and having a housing 2 and a rotor 3 arranged for rotation therein. The rotor 3 is driven by a suitable electric drive motor 4. Beneath the rotor 3 there is located an outlet housing or compartment 5 which is separated by a sieve or screen 6 from the remaining chamber 1' of the housing 2. At the outlet housing 5 there is connected an outlet line or conduit 7 containing a pump 8 which leads to a secondary pulper or fiberizer 10.

The secondary pulper or fiberizer 10 which can be constructed, for instance, in the manner disclosed in U.S. Pat. No. 3,942,728, granted Mar. 9, 1976, U.S. Pat. No. 4,135,671, granted Jan. 23, 1979 or Austrian Patent No. 346,170, granted Oct. 25, 1978, contains a housing 11 within which there is located a rotor 12 whose arms 13 are movable along a sieve or screen 14 separating the internal chamber or compartment 11' of the housing 11 from an outlet housing or compartment 15. When the rotor 12 is operated it is driven by a suitable electric motor 16. Leading from the outlet housing 15 is an outlet line or conduit 17 to a vat or tub 18 for good stock, which for instance, can be constituted by the vat or chest of a not particularly illustrated papermaking machine.

The secondary pulper or fiberizer 10 has two outlet lines 20, 21, and specifically, the line 20 which extends out of its axial region, and the line or conduit 21 which extends out of its circumferential or external region. The outlet line 20 serves for the removal of stock suspension containing lighter contaminants or rejects, while the line or conduit 21 serves for withdrawing stock suspension containing heavier rejects or contaminants.

Both of the outlet lines 20 and 21 lead to an intermediate vat or chest 22 from which extends a line or conduit 23, equipped with a pump 24, this conduit 23 leading to a hydrocyclone 25. Extending out of the hydrocyclone 25 is a line or conduit 26 to a second secondary pulper or fiberizer 30 which can be constructed in the same manner as the first secondary pulper or fiberizer 10. Thus, as a matter of convenience the components or parts thereof have been designated by generally the same reference characters as the analogous parts or components of the fiberizer 10.

Leading from the outlet housing 15 of the second secondary pulper or fiberizer 30 is a line or conduit 31 to the good stock vat 18. An outlet line or conduit 32 which extends out of the central region of the housing 11 of the fiberizer 30 leads to an intermediate vat 33 or equivalent structure. An outlet line or conduit 34 leading from the circumference of the housing 11 of the secondary pulper or fiberizer 30 conveys heavy contaminants or rejects which should be eliminated from the installation and deposited.

Leading from the intermediate vat 33 is a line or conduit 35 which extends to a dynamic jarrer or vibrator 36 which contains a vibrating screen 37 and a throughpass container or vat 38. Leading outwardly from the throughpass container 38 is an outlet or outfeed line 40 which has two branches 41, 42, and specifically, branch 41 which leads to the good stock vat 18 and a branch 42 which leads back into the installation and at that location can be connected at a suitable point of the installation.

During operation of the equipment bales of waste paper are inserted into the stock slusher or pulper 1, and at the same time the water W needed for paper processing purposes, while possibly adding thereto suitable chemicals, is infed to the stock slusher or pulper 1. Eliminated heavy constituents can be removed from the stock slusher 1 by an outlet line 2', which for instance contains a conventional sluice.

The obtained stock suspension is removed from the stock slusher or pulper 1 through the line or conduit 7 and infed into the secondary pulper or fiberizer 10 where it is further processed. The fiberizer 10, which operates with a stock density of 3 percent to 5 percent, can have removed therefrom by the action of the sieve or screen 14 having holes or perforations in the order of 2 to 3 millimeters diameter, already approximately 60 to 80 percent of the stock suspension and such can be infed by means of the line or conduit 17 to the good stock vat 18. The relatively fine holes or perforations of the screen 14 ensure that only completely defiberized stock fibres can reach the good stock container 18, which therefore are immediately useful, without further processing, for fabricating paper or cardboard or the like.

By means of the lines or conduits 20 and 21 the stock or material which has overflown and not passed through the screen 14 arrives at the intermediate vat 22 and from that location is delivered into the hydrocyclone 25 where there are eliminated possibly remaining heavy constituents or rejects. In the second secondary pulper or fiberizer 30 there is completed the defiberizing and screening action, and the obtained good stock likewise is screened by the sieve or screen 14 having a perforation or hole size of 2 to 3 millimeters and is conveyed by the line or conduit 31 into the good stock vat 18.

Possibly remaining heavy constituents or rejects in the secondary pulper or fiberizer 30 are eliminated from the installation through the line or conduit 34. Stock suspension containing rejects and which has not passed through the screen 14 arrives by means of the outlet line 32 at the second intermediate vat 33. From this vat 33 it is possible to therefore place onto the vibrating screen 37 the stock suspension which can contain foil pieces formed of plastic and possible residual materials of not completely defiberized paper. At this location there is accomplished a separation of the large size parts from the stock suspension, which then can be conducted through the line or conduit 40 and its branch or branch portion 41 into the good stock vat 18. It is however possible to provide a return flow into a forward part of the installation by means of the line or conduit 42.

Large size pieces can be eliminated from the sieve or screen 37, as such has been schematically represented by the arrow D.

As also apparent from the illustration of the drawing, the second intermediate vat 33 is provided with a circulation system or flow conduit arrangement, generally indicated by reference character 80, in which there is arranged a despeckling or stain removal device 50. This despeckling or stain removing device 50, which is conventional and may be constructed for instance in accordance with the teachings of U.S. Pat. No. 4,011,027, granted Mar. 8, 1977, contains a rotor 60 and a stator 62 having intermeshing rows of teeth 64, so that the stock suspension moving through the despeckling or stain removal device 50 is subjected to a shearing action. Due to this shearing action not completely defiberized paper parts and speckles or stains contained in the individual fibres are defiberized and broken-up. Plastic foils however are only inappreciably comminuted. The outlet line or conduit 51 of the despeckling device 50 leads, as illustrated, back to the intermediate vat 33. Additionally, there is also provided a valve 52 which enables turning-off the despeckling or stain removal device 50. Since the despeckling device 50 possesses a certain pumping action, it is possible to dispense with the use of a pump in the circulation flow system of the despeckling device 50.

As will be apparent from the disclosure, an extremely large proportion of the stock suspension which is formed in the stock slusher or pulper 1 flows through the line 17 directly into the good stock vat 18. Tests have shown that this proportion is in the order of magnitude between 60 to 80 percent. Consequently there is an extensive relieving of load of the parts arranged after the secondary pulper 10, the hydrocyclone 25, the secondary pulper or fiberizer 30 and the despeckling or stain removal device 50. Hence, on the one hand, there is realized an improvement in the mode of operation and, on the other hand, a saving in energy.

As already mentioned, the use of the secondary pulpers or fiberizers 10 and 30 containing screens having suitable size openings or perforations, constitutes a possible and, in fact, preferred construction of the invention. But the invention is in no way limited to the exemplary embodiment. Thus, in place of the secondary pulpers or fiberizers there also can be employed screen devices, such as for instance known thick stock sorting devices, wherein however for obtaining the comminution action there additionally must be provided appropriate equipment. A secondary pulper or fiberizer combines both of these actions in a most simple manner.

While there are shown present preferred embodiments of the the invention, it is to be distinctly understood that the invention is not limited thereto, but may be otherwise variously embodied and practiced within the scope of the following claims, Accordingly, what I claim is:

1. An apparatus for preparing waste paper for obtaining stock suspension for the fabrication of new paper and cardboard, comprising:
a stock slusher through which passes waste paper;
at least one fiberizer arranged after and cooperating with the stock slusher;
said at least one fiberizer containing a housing; a screen and a motor-driven rotor arranged within said housing;
said rotor having arm means movable along said screen;
outlet means through which flows good stock which has passed through the screen arranged in flow communication with said screen;
said housing having at least one outlet for overflow material effluxing from said housing;
said screen of said at least one fiberizer containing perforations of a size suitable for separating fibers which can be directly used for paper fabrication;
a vat of a papermaking machine connected in flow communication with the outlet means for the good stock of said at least one fiberizer;
said at least one fiberizer contains an outlet line for lighter overflow material;
a dynamic vibrator with which there is operatively connected said outlet line for the lighter overflow material of said at least one fiberizer;
a vat means located at the outlet line for the lighter overflow material of said at least one fiberizer and flow communicating said outlet line with said dynamic vibrator;
circulation flow means provided for said vat means;
a despeckling device arranged in said circulation flow means of said vat means; and
a throughflow container provided for the dynamic vibrator; and
said throughflow container being connected with said vat of the papermaking machine.

2. An apparatus for preparing waste paper for obtaining stock suspension for the fabrication of new paper and cardboard, comprising:
a stock slusher through which passes waste paper;
a first fiberizer arranged after and cooperating with the stock slusher;
said first fiberizer containing a housing;
a screen and a motor-driven rotor arranged within said housing;

said rotor having arm means movable along said screen;
outlet means through which flows good stock which has passed through the screen arranged in flow communication with said screen;
said housing having at least one outlet for overflow material effluxing from said housing;
said screen of said first fiberizer containing perforations of a size suitable for separating fibers which can be directly used for paper fabrication;
a vat of a papermaking machine connected in flow communication with the outlet means for the good stock of the first fiberizer;
a second fiberizer connected with the at least one outlet for the overflow material of the first fiberizer;
said second fiberizer containing a screen having perforations of a size suitable for screening essentially all fibers which can be directly used for paper fabrication;
said second fiberizer having outlet means for good stock which has passed through the screen of said second fiberizer;
said outlet means of said second fiberizer being connected in flow communication with said vat of the papermaking machine;
the perforations of the screen of the first fiberizer containing holes having a diameter in a range of approximately 2 to 3 millimeters;
said second fiberizer contains an outlet line for lighter overflow material;
a dynamic vibrator with which there is connected said outlet line for the lighter overflow material of the second fiberizer;
a vat located at the outlet line for the lighter overflow material of the second fiberizer;
circulation flow means provided for said vat; and
a despeckling device arranged in said circulation flow means of said vat.

3. The apparatus as defined in claim 2, wherein:
the perforations of the screen of the second fiberizer contain holes having a diameter in a range of approximately 2 to 3 millimeters.

4. The apparatus as defined in claim 2, further including:
a throughflow container provided for the dynamic vibrator; and
said throughflow container being connected with said vat of the papermaking machine.

* * * * *